(12) United States Patent
Klitsner et al.

(10) Patent No.: US 6,612,573 B2
(45) Date of Patent: Sep. 2, 2003

(54) ELECTRONIC GAME APPARATUS SIMULATING VARIABLE LAUNCH POWER AND DIRECTION OF GAME OBJECT

(76) Inventors: Daniel B. Klitsner, 441 Holcomb Ave., Larkspur, CA (US) 94939; Brian P. Clemens, 4306 17th St., San Francisco, CA (US) 94114

( * ) Notice: Subject to any disclaimer, the term of this patent is extended or adjusted under 35 U.S.C. 154(b) by 160 days.

(21) Appl. No.: 09/779,168

(22) Filed: Feb. 8, 2001

(65) Prior Publication Data

US 2002/0107064 A1 Aug. 8, 2002

(51) Int. Cl.⁷ .................................................. A63F 7/02
(52) U.S. Cl. ........................ 273/120 A; 463/7; 200/5 R
(58) Field of Search .............................. 463/1, 2–5, 7, 463/36–39; 273/120 A, 129 W, 108.1, 108.55, 148 B, 118 R, 119 R, 121 B, 123 R, 124 R, 127 R, 129 R, 129 S, 129 T, 237; 200/11 J, 11 DA, 11 TW, 17 R, 17 B, 18, 4, 5 R, 6 A, 175–179, 564, 570, 571, 61.39, 61.74; 361/1; 345/156–184; 340/672

(56) References Cited

U.S. PATENT DOCUMENTS

| | | | | |
|---|---|---|---|---|
| 3,275,322 A | * | 9/1966 | Burnside et al. | 273/119 A |
| 3,288,467 A | * | 11/1966 | Rudolph | 273/317.2 |
| 3,647,213 A | * | 3/1972 | Baker | 273/355 |
| 4,147,350 A | * | 4/1979 | Usami | 463/51 |
| 4,283,049 A | * | 8/1981 | Karlin et al. | 473/107 |
| 4,346,892 A | | 8/1982 | Kitchen et al. | |
| 4,508,343 A | * | 4/1985 | Peters et al. | 273/119 A |
| 4,521,020 A | * | 6/1985 | Uemura et al. | 463/3 |
| 5,774,075 A | * | 6/1998 | Palalau et al. | 341/35 |
| 5,801,346 A | * | 9/1998 | Taniuchi | 200/11 K |
| 6,225,980 B1 | * | 5/2001 | Weiss et al. | 345/161 |
| 6,296,571 B1 | * | 10/2001 | McVicar | 463/38 |
| 6,325,719 B1 | * | 12/2001 | Fukawa et al. | 463/37 |

OTHER PUBLICATIONS

Puzzle Bobble, Taito, Inc. (1994) <www.klov.com/game_detail.php?letter=p&game_id=2447>, pp. 1–13.*
Pinball Arcade, Microsoft Corp (1998) <www.microsoft.com/games/pinball>, 1–12.*

* cited by examiner

Primary Examiner—Mark Sager
Assistant Examiner—Steven Ashburn
(74) Attorney, Agent, or Firm—Roy A. Ekstrand

(57) ABSTRACT

An electronic game apparatus includes a display for depicting multiple launch positions and multiple launch power levels for a to-be-launched game object. The display further includes a plurality of game object icons which may be selectively activated to depict the travel of the game object. A launch control includes a control button movable within a multiply fluted guide against the force of a pair of symmetrically positioned springs. A switch contact is carried by the control button and cooperates with a plurality of conductive switch pads. The movable contact of the launch control button and the conductive pads cooperate to provide switch inputs of selection and duration for the game unit as the launch control button is manipulated.

3 Claims, 2 Drawing Sheets

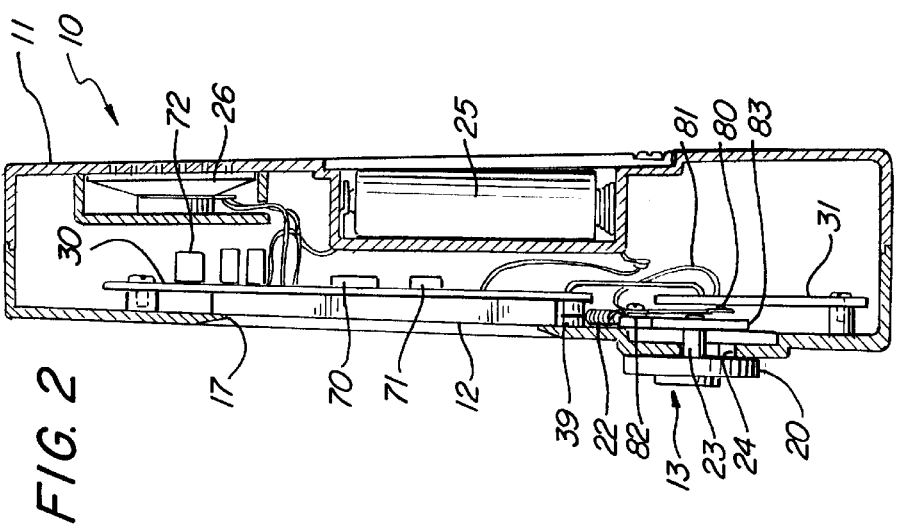
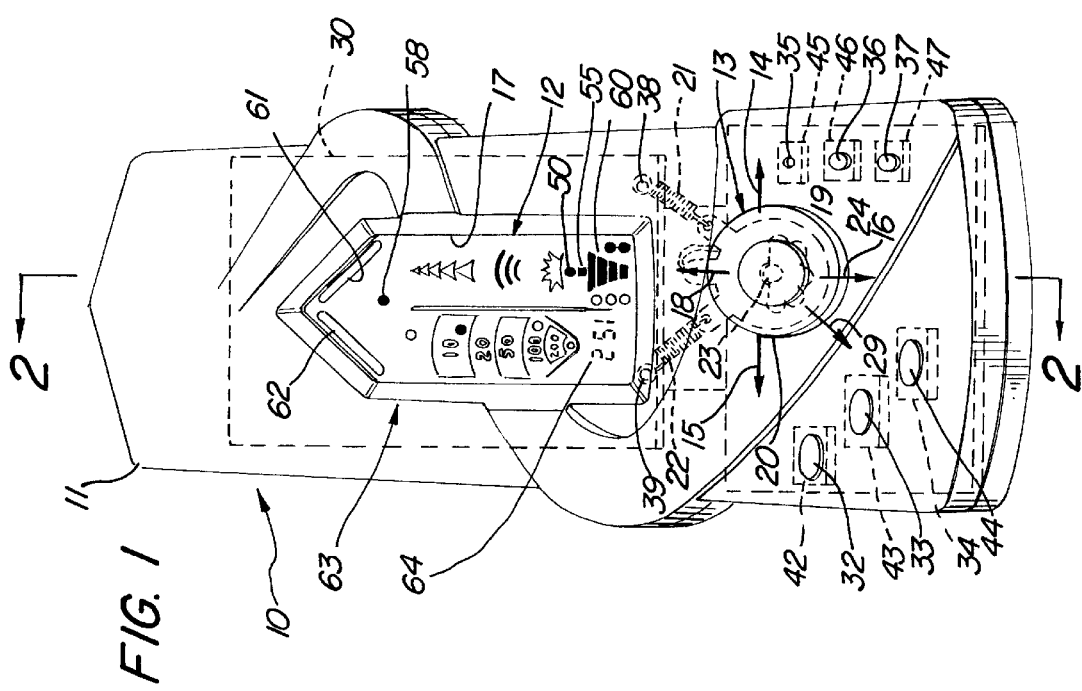

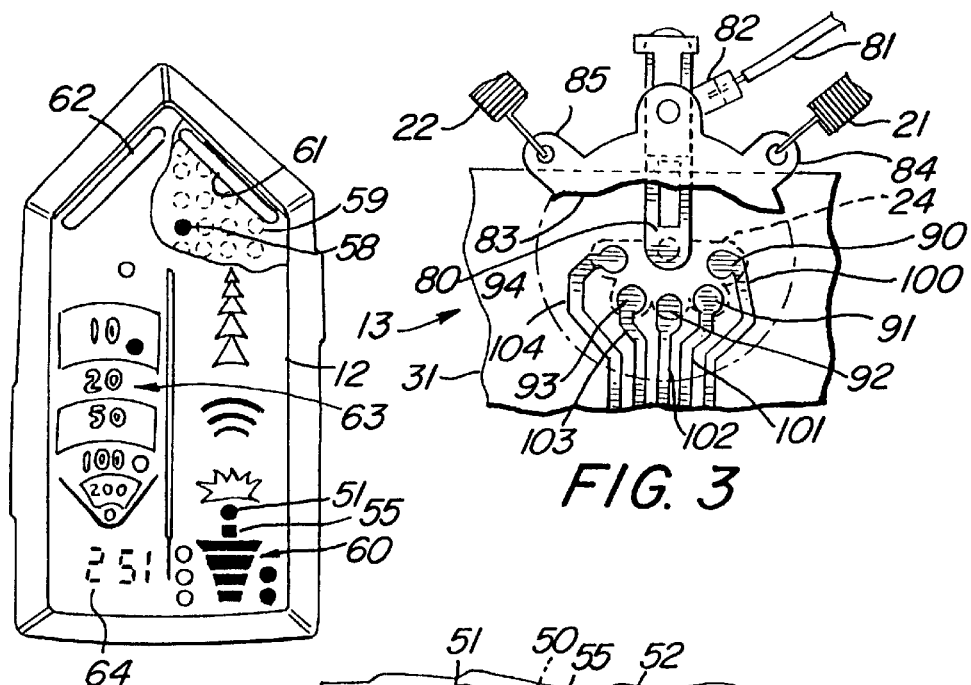
FIG. 3
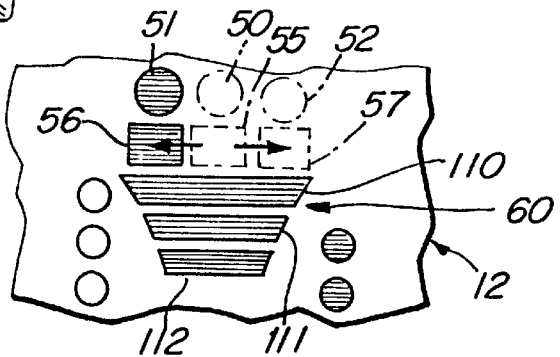
FIG. 7
FIG. 4
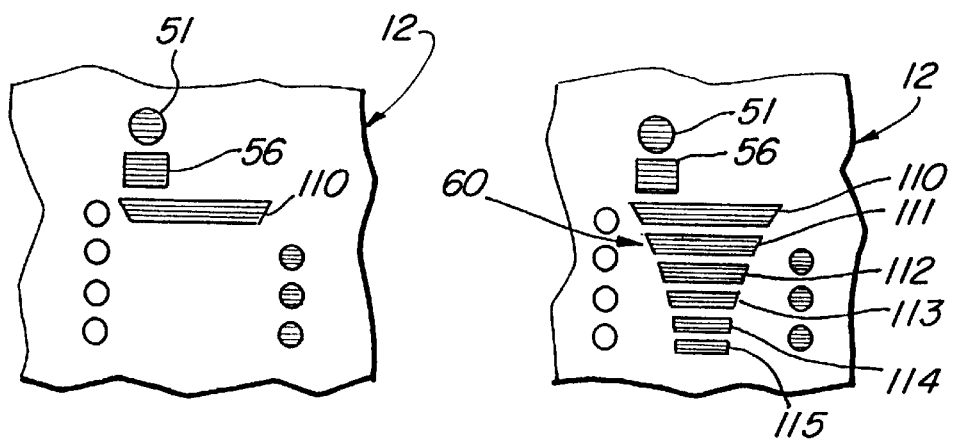
FIG. 5   FIG. 6

ELECTRONIC GAME APPARATUS SIMULATING VARIABLE LAUNCH POWER AND DIRECTION OF GAME OBJECT

FIELD OF THE INVENTION

This invention relates generally to electronic games and particularly to those which offer simulation of game object movements, launch and/or control.

BACKGROUND OF THE INVENTION

Electronic games have proven to be an extremely popular type of game enjoyed by a wide range of children and adult users. The recent increase in the popularity of electronic games is due in large measure to dramatic developments within electronic technologies. Such developments have included low cost, battery operable digital electronic integrated circuit technologies which have provided for microprocessor based systems. Additionally, a corresponding advance in display technology has further contributed to the widespread increase in the popularity of electronic games. Of particular importance in the advance of display technologies has been the rapid development of sophistication and reduced costs of liquid crystal displays (LCD).

While electronic games have been provided in a variety of sizes and configurations, one popular variant of electronic games has been the development of handheld games. Such games derive their name from the small often elongated housings which they utilize. These small housings are configured to be readily held in the hands of the users. Typically, a small display together with one or more user operated controls such as buttons are supported upon the housing. Within the housing, a typical handheld game utilizes an integrated circuit microprocessor and memory system together with internal batteries for providing operative power.

Further enhancement of electronic games has resulted from the increased development of small, low cost sound circuits and the corresponding development of small low power electro-acoustic transducers such as piezo-electric devices. The result of such sound circuit and transducer development has been the ready inclusion of sound capability within even the smallest of handheld electronic games. Additionally, larger electronic games not configured for handheld use have been provided with substantial sound producing capability.

One of the more amusing types of electronic games has been provided by electronic games which mimic the game play of sports or games which are often played on large facilities or apparatus. For example, U.S. Pat. No. 4,346,892 to Kitchen, et al. sets forth an ELECTRONIC POOL GAME having a housing which supports a matrix display representative of the playing surface of a pool table. A control and driving circuit is provided for applying driving signals to the matrix display representing pool balls including a cue ball and the further representation of the direction of travel of the cue ball. Input switches are provided for applying control signals to the control and driving circuit to control the placement and orientation of the direction indicia and at least the initiation of the displacement across the matrix display of the cue ball indicia. The driving and control circuit may be adapted to detect the duration of engagement of an input switch for controlling the velocity of displacement of the cue ball indicia proportional to at least a portion of the duration of such engagement. In this manner, the direction and velocity of the cue ball is operated under user control and becomes the object of the user's skill in manipulating the game.

While electronic games such as the above-described prior art games have provided substantial improvement in the art and have in some instances enjoyed commercial success, there remains nonetheless a continuing need in the art for evermore improved, interesting and amusing electronic games. There remains a particular need in the art for a more realistic, improved and amusing electronic game having a control manipulated by the user for simulating the launch of a game object.

SUMMARY OF THE INVENTION

Accordingly, it is a general object of the present invention to provide an improved electronic game. It is a more particular object of the present invention to provide an improved electronic game which simulates the launch direction and launch power of a simulated game object. It is a still more particular object of the present invention to provide an improved electronic game which utilizes a relatively inexpensive and realistic control apparatus for manipulation by the user in simulating the control of a game object launch direction and launch power.

In accordance with the present invention, there is provided electronic game apparatus comprising: a housing defining an interior cavity; a display, supported on the housing, having a plurality of to-be-launched game object icons, a target icon, a power icon, and a plurality of launched game icons; a launch control having a multiply-fluted guide aperture formed in the housing, a control button, a post extending from the control button through the guide aperture, a flange supported upon the post within the interior cavity, a movable contact supported upon the flange, a switch board within the interior cavity, a plurality of conductive pads supported by the switch board, and spring means coupled to the flange urging the flange toward a first position; and a microprocessor and memory for controlling the display, the post and the guide aperture cooperating to limit movement of the control button and the flange to a plurality of selectable positions in which the movable contact touches one of the plurality of conductive pads, and the selectable positions including a center launch game object position, a left launch game object position, a right launch game object position, a straight line launch direction position, a left angled launch direction position and a right angled launch direction position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of an electronic game apparatus constructed in accordance with the present invention;

FIG. 2 sets forth a section view of the game apparatus of FIG. 1 taken along section lines 2—2 therein;

FIG. 3 sets forth a partial section view of the user control device of the present invention game apparatus;

FIG. 4 sets forth a partial view of the object launching portion of the display utilized in the present invention game apparatus;

FIG. 5 sets forth a partial view of the object launching portion of the present invention game apparatus display;

FIG. 6 sets forth a still further partial view of the present invention game apparatus display showing a to-be-launched game object; and FIG. 7 sets forth an enlarged view of the display utilized in the present invention game apparatus showing the various display icons and elements therein.

DESCRIPTION OF THE PREFERRED EMBODIMENTS

FIG. 1 sets forth a perspective view of a game apparatus constructed in accordance with the present invention and generally referenced by numeral 10. Game apparatus 10 includes a housing 11 configured for convenient holding within the user's hand. Housing 11 further defines an aperture 17 within which a display unit 12 is supported. Display unit 12 is described below in greater detail. However, suffice it to note here that display unit 12 is preferably fabricated using a liquid crystal display (LCD) within which a plurality of game icons are supported. For purposes of illustration, FIG. 1 shows various icons in visible configuration within display 12. These icons include a power icon 60, a position icon 55, and a to-be-launched puck icon 50. Additionally, display 12 includes a pair of angularly positioned rebound icons 61 and 62 together with a target icon 63 and a score indicia 64.

Housing 11 further includes a plurality of switch buttons 32, 33, 34, 35, 36 and 37 supported upon housing 11. Within housing 11, a switch board 31 supports a plurality of switches 42, 43, 44, 45, 46 and 47 positioned respectively beneath buttons 32 through 37 and actuated thereby.

In accordance with an important aspect of the present invention, housing 11 further defines a multiply fluted guide 24. Guide 24 receives a post 23 which in turn is secured to a control button 20. Control button 20 and post 23 provide a movable launch control 13 which is actuated by the user.

Housing 11 further supports a printed circuit board 30 which, as is better seen in FIG. 2, supports the digital electronic circuit components which operate and control the game apparatus within housing 11. Suffice it to note here that circuit board 30 further includes a pair of posts 38 and 39 which secure the forward ends of a pair of springs 21 and 22. The remaining end of springs 21 and 22 are secured in the manner set forth below in FIG. 3 to launch control 13.

In accordance with the present invention, launch control 13 is movable upon housing 11 under the guidance of post 23 within multiply fluted guide 24 (formed in housing 11). Accordingly, springs 21 and 22 provide a spring force which urges launch control 13 forwardly in the direction indicated by arrow 18. In addition, the symmetrical positioning of springs 21 and 22 with respect to the center line of launch control 13 urge control button 20 and thereby post 23 to a generally centered position. In the operation of launch control 13 described below in greater detail, the user is able to move launch control button laterally in the directions indicated by arrows 14 and 15 overcoming the forces of springs 21 and 22. The user is further able to draw control button 20 rearwardly in the direction indicated by arrow 16 also by overcoming the forces of springs 21 and 22. Thus, the combination of post 23, guide 24, and springs 21 and 22 cooperate to allow the user to draw control button 20 into a plurality of positions defined by the structure of guide 24 against the forces of springs 21 and 22. Once the user releases control button 20, however, springs 21 and 22 cooperate to reposition control button 20 in the forward and centered position shown in FIG. 1.

The operation of launch control 13 is described below in greater detail. However, suffice it to note here that the user is able to simulate the launch of a puck within display 12 from either the centered position shown for to-be-launched puck icon 50 or, alternatively, positions to the left or right thereof (seen in FIG. 4). The center positioning of the to-be-launched puck icon is selected by the centered position of launch control 13. Correspondingly, movement of launch control button 20 to the right in the direction indicated by arrow 14 selects a launch position on the right side of display 12 (position 57 and puck icon 52 seen in FIG. 4) while, alternatively, movement of control button 20 to the left in the direction indicated by arrow 15 selects the position of the to-be-launched puck and position icon to correspond to icons 51 and 56 seen in FIG. 4.

In addition to selection of the launch position for the to-be-launched puck icon, the user is able to manipulate control button 20 to select a desired direction of launch. Thus, as the user draws control button 20 rearwardly against the force of springs 21 and 22 in preparation for launch, the angle of departure or direction imparted to the to-be-launched puck is determined by the axis upon which control button 20 is withdrawn. For example, should the user draw control button 20 directly rearwardly in the direction indicated by arrow 16, the direction of launch imparted to the puck icon is directly forward in a "straight line" direction. If, however, the user draws control button 20 in a direction angled to the right as indicated by arrow 19, the release of control button 20 launches the puck icon in a direction angled to the left within display 12. Conversely, drawing control button 20 in the direction indicated by arrow 29 will, upon release of control button 20, launch the puck icon in a direction within display 12 which is angled toward the right side of the display.

Thus, the user is able to select the position from which the puck icon is to be launched and is able to select the direction or angular component upon which the puck icon is to travel.

In further accordance with the present invention and as is set forth below in FIG. 3 in greater detail, a plurality of electrical contacts supported upon switch board 31 together with a movable contact supported upon control button 20 cooperate to determine the launch power to be applied to the puck icon upon release of control button 20. This launch power control is described below in FIGS. 3 through 6 in greater detail. However, suffice it to note here that the amount of power applied during game object launch is determined by the time interval which the user holds control button 20 in its withdrawn position.

Accordingly, the user executes game play by initially positioning the to-be-launched icon at the center, left or right by simply moving control button 20 accordingly. Once the launch position has been selected, the user determines the direction of simulated game object launch by selecting the direction of withdrawal of control button 20. Finally, the power to be applied to the launched object is determined as the user holds control button 20 in its drawn position for the desired time. It will be noted that in the manner set forth below in FIGS. 5 and 6 in greater detail, the user observes power icon 60 of display 12 to determine the launch power to be applied.

FIG. 2 sets forth a section view of game 10 taken along section lines 2—2 in FIG. 1. As described above, game 10 includes a housing 11 defining an aperture 17 and a guide 24. Housing 11 further supports a speaker 26 and a plurality of batteries such as battery 25. A display 12 is supported within housing 11 in alignment with aperture 17 and a circuit board 30 provides support for display 12 while simultaneously supporting a plurality of electronic circuit components including a microprocessor integrated circuit 70, a memory 71 and a plurality of circuit components such as circuit component 72. A switch board 31 is also supported within housing 11 beneath guide 24.

In accordance with an important aspect of the present invention, a launch control 13 includes a control button 20 movably supported upon the upper surface of housing 11 having a post 23 extending inwardly through guide 24. A flange 83 is secured to the interior end of post 23 to captivate control button 20 within guide 24 in a slidable attachment. In the manner set forth below in FIG. 3, flange 83 further supports a terminal 82 which in turn supports an electrical contact 80. A connecting wire 82 provides electrical connection to terminal 82. A plurality of additional connecting wires are shown within housing 11 and, in accordance with conventional fabrication techniques, provide various electrical and power connections between circuit board 30, speaker 26, battery 25 and switch board 31.

Flange 83 is positioned by a pair of springs 21 and 22 (spring 21 seen in FIG. 3). A post 39 formed on the upper surface of circuit board 30 secures the remaining end of spring 22. Returning briefly to FIG. 1, it will be noted that a corresponding post 38 is supported upon circuit board 30 which secures the remaining end of spring 21.

Returning to FIG. 2, it will be noted that in accordance with an important aspect of the present invention, the degree of movement available for control button 20 of launch control 13 is determined by the extension of post 23 within guide 24. Thus, while control button 13 is slidably movable upon housing 11, the extent and direction of control button movement is limited by the interaction of post 23 and guide 24. It will also be noted that contact 80 is positioned upon the upper surface of switch board 31. The purpose of contact 80 and its position upon switch board 31 is set forth below in FIG. 3. Suffice it to note here that electrical connection is made between contact 80 and conductive elements formed upon the upper surface of switch board 31 as control button 20 is moved. This in turn provides input signals for microprocessor 70 to control game play accordingly.

FIG. 3 sets forth a partial section view of the operative mechanism of launch control 13. As described above, switch board 31 is positioned within housing 11 in the manner shown in FIG. 2 directly beneath launch control 13. As is also described above, launch control 13 includes a control button 20 supporting a flange 83 together with a post 23 extending through a multiply fluted guide 24.

Returning to FIG. 3, flange 83 includes a terminal 82 having a connecting wire 82 secured thereto. Terminal 82 further supports a contact 80 which it will recalled is positioned against the upper surface of switch board 31. A pair of springs 21 and 22 are secured to a pair of tabs 84 and 85 respectively formed on flange 83. Switch board 31 further defines a plurality of conductive pads 90, 91, 92, 93 and 94 which are positioned in an arcuate arrangement. A plurality of conductive paths 100 through 104 are respectively connected to conductive pads 90 through 94. Paths 100 through 104 provide electrical connection to microprocessor 70 (seen in FIG. 2). For purposes of illustration, a dashed outline of guide 24 is shown positioned in its alignment with pads 90 through 94. It will be noted that each of pads 90 through 94 is positioned beneath a respective one of the locating lobes or flutes of guide 24.

In operation, the release of launch control 13 allows springs 21 and 22 to position flange 83 and thereby contact 80 in the open position shown in FIG. 3. It will be noted that contact 80 does not touch any of pads 90 through 94 in this position. Accordingly, the relaxed position of launch control 13 shown in FIG. 3 does not provide a signal input to microprocessor 70 (seen in FIG. 2). Launch control 13 is able to impart signal inputs to microprocessor 30 as contact 80 is moved into contact with any one of pads 90 through 94. Accordingly, if the user moves launch control 13 to the right, contact 80 is brought upon conductive pad 90 producing an input signal to microprocessor 70 (seen in FIG. 1). Alternatively, movement of launch control 13 to the left brings contact 80 against conductive pad 94 providing a different signal input to the game microprocessor. Similarly, drawing launch control 13 directly downwardly brings contact 80 against conductive pad 92 providing a still further input to the system microprocessor. Similarly, movement of launch control 13 at a right side angle brings contact 80 against conductive pad 91 producing a different signal input to the system microprocessor while moving launch control 13 at a leftward angle brings contact 80 against conductive pad 93 producing a still further variation of signal input to the system microprocessor. It will be recalled from the descriptions set forth above and connection with FIG. 1 that the movement of launch control 80 to either the left or right (conductive pads 90 or 94) is used to control the launch position of the to-be-launched puck. Similarly, it will be recalled that movement of launch control 13 against springs 21 and 22 in a straight line draw (against contact 92) produces a straight line puck launch while a draw to the right (against contact 91) launches the puck to left. Finally, a leftward angled draw (against contact 93) causes a rightward angled launch direction.

FIG. 4 sets forth an enlarged view of the display icons associated with positioning and launch of a puck icon or game object. Thus, display 12 includes a trio of position icons 55, 56 and 57 together with a corresponding trio of to-be-launched puck icons 50, 51 and 52 respectively. In addition, display 12 includes a power icon 60 having a plurality of power indicators such as indicators 110, 11 and 112 (as well as indicators 113, 114 and 115 seen in FIG. 6). In the solid line representation shown in FIG. 4, the user has selected the launch position to the left side of display 12 corresponding to launch position 56. It will be recalled that this launch position is selected by moving launch control button 20 to the left (seen in FIG. 1). Accordingly, icons 51 and 56 are shown visible to indicate the position selected by the user. Should the user select the center launch position (icon 55), icon 55 and puck icon 50 would then be visible. Finally, should the user select the right side launch position, icons 52 and 57 would be visible.

In the preferred operation of the present invention game apparatus, the user selects the direction of game object launch by drawing control button 20 (seen in FIG. 1) either directly back for straight line launch or the left or right for an angled launch. In addition, the time duration over which the user holds the launch control button in its drawn position determines the launch power to be applied. In the configuration shown in FIG. 4, the user has selected a power left corresponding to three launch power icons. Once the user releases the launch control button (seen in FIG. 1), puck 51 is then launched and travels across display 12 as described in FIG. 7.

FIGS. 5 and 6 set forth portions of display 12 illustrating two different power level selections by the user. In FIG. 5, display 12 is shown having position icon 56 selected which causes puck icon 51 to be visible. The user in FIG. 5 has selected the lowest power level and, as a result, a single icon 110 is shown in its visible condition.

FIG. 6 shows the condition of power icon 60 when the user has selected a full launch power. Thus, upon display 12, icons 56 and 51 indicate the position selection of launch while power icon 60 shows icons 110 through 115 in their visible state indicating the user has held the launch control in its drawn position for a maximum time selecting a full power launch.

FIG. 7 sets forth an enlarged view of display 12. As described above, display 12 includes a power icon 60, a position icon 55 and a to-be-launched puck icon 51. In addition, display 12 includes a pair of rebound icons 61 and 62 together with a target icon 63 and a score indicia 64. FIG. 7 also shows a plurality of puck icons 59 which are positioned in a generally uniform arrangement upon the entire extent of display 12. To avoid unduly cluttering FIG. 7, a portion of display 12 is shown revealing icons 59. Icons 59 are usually invisible and are selectively switched to their visible condition by microprocessor 70 (seen in FIG. 2) to depict a sequence of puck positions indicative of the travel path of a puck following launch. For purposes of illustration, icon 58 is shown switched to its visible condition. Thus, as the user launches puck 51, a succession of icons 59 are switched briefly from invisible to visible states in an appropriate sequence to illustrate the travel of the launched puck. In the game play shown in FIG. 7, a simulated puck is thus launched from position 51 and impacts rebound icons 61 and 62 and is redirected toward target 63. The ultimate position of the simulated puck is determined by the initial launch conditions under the game control rules.

What has been shown is an electronic game apparatus simulating variable launch power and direction of a game object in which a novel launch control allows the user to manipulate a single control button and thereby set the launch position, launch direction and launch power of the simulated game object.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. Electronic game apparatus comprising:

a housing defining an interior cavity;

a display, supported on said housing, having a plurality of to-be-launched game object icons, a target icon, a power icon, and a plurality of launched game icons;

a launch control having a multiply-fluted guide aperture formed in said housing, a control button, a post extending from said control button through said guide aperture, a flange supported upon said post within said interior cavity, a movable contact supported upon said flange, a switch board within said interior cavity, a plurality of conductive pads supported by said switch board, and spring means coupled to said flange urging said flange toward a first position; and a microprocessor and memory for controlling said display, said post and said guide aperture cooperating to limit movement of said control button and said flange to a plurality of selectable positions in which said movable contact touches one of said plurality of conductive pads, and said selectable positions including a center launch game object position, a left launch game object position, a right launch game object position, a straight line launch direction position, a left angled launch direction position and a right angled launch direction position.

2. The electronic game apparatus set forth in claim 1 wherein spring means include a pair of springs coupled to said flange on opposed sides thereof.

3. The electronic game apparatus set forth in claim 2 wherein said pair of springs are symmetrically positioned relative to said guide aperture and wherein said first position is generally centered in said guide aperture.

* * * * *